United States Patent Office 3,471,774
Patented Oct. 7, 1969

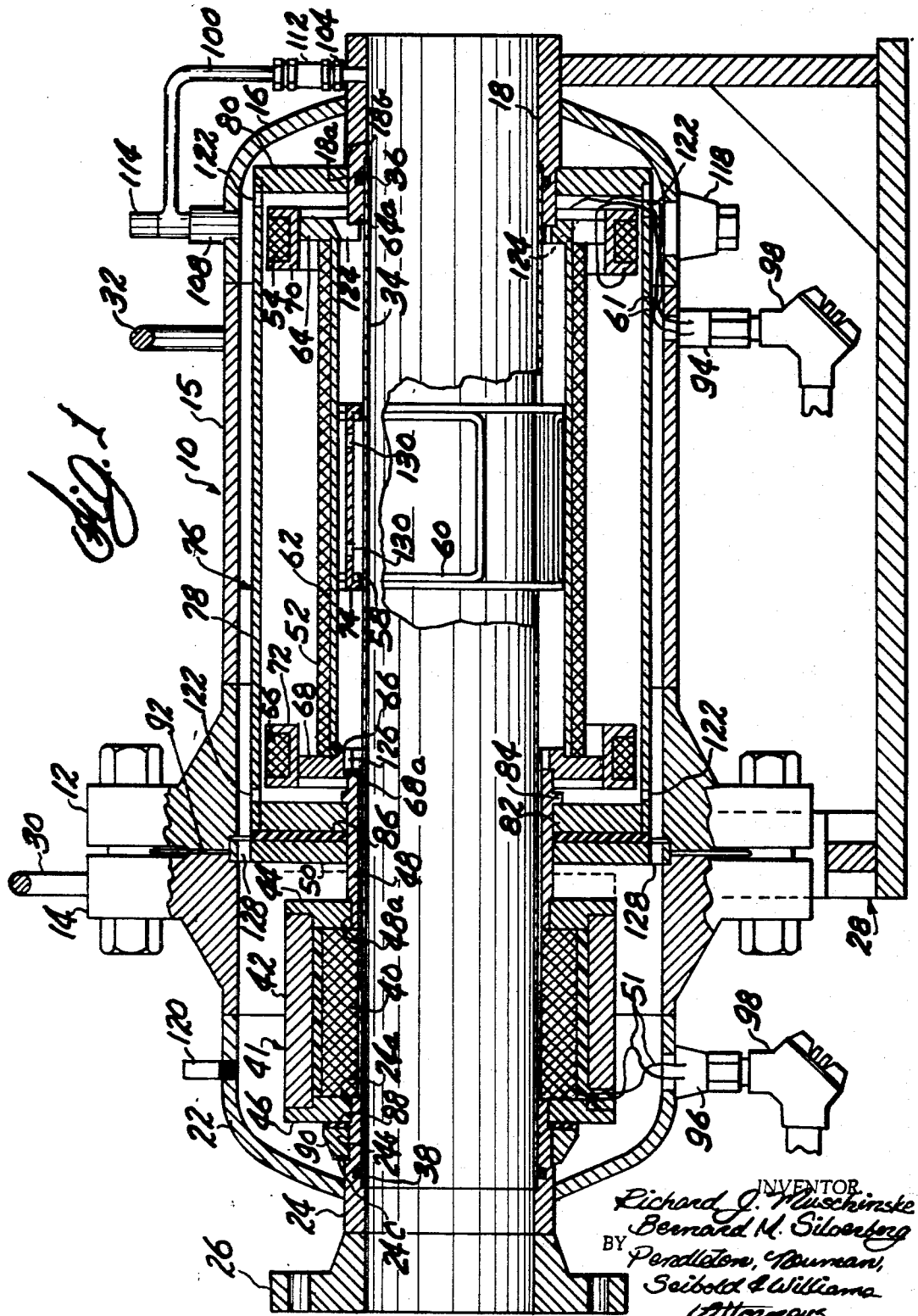

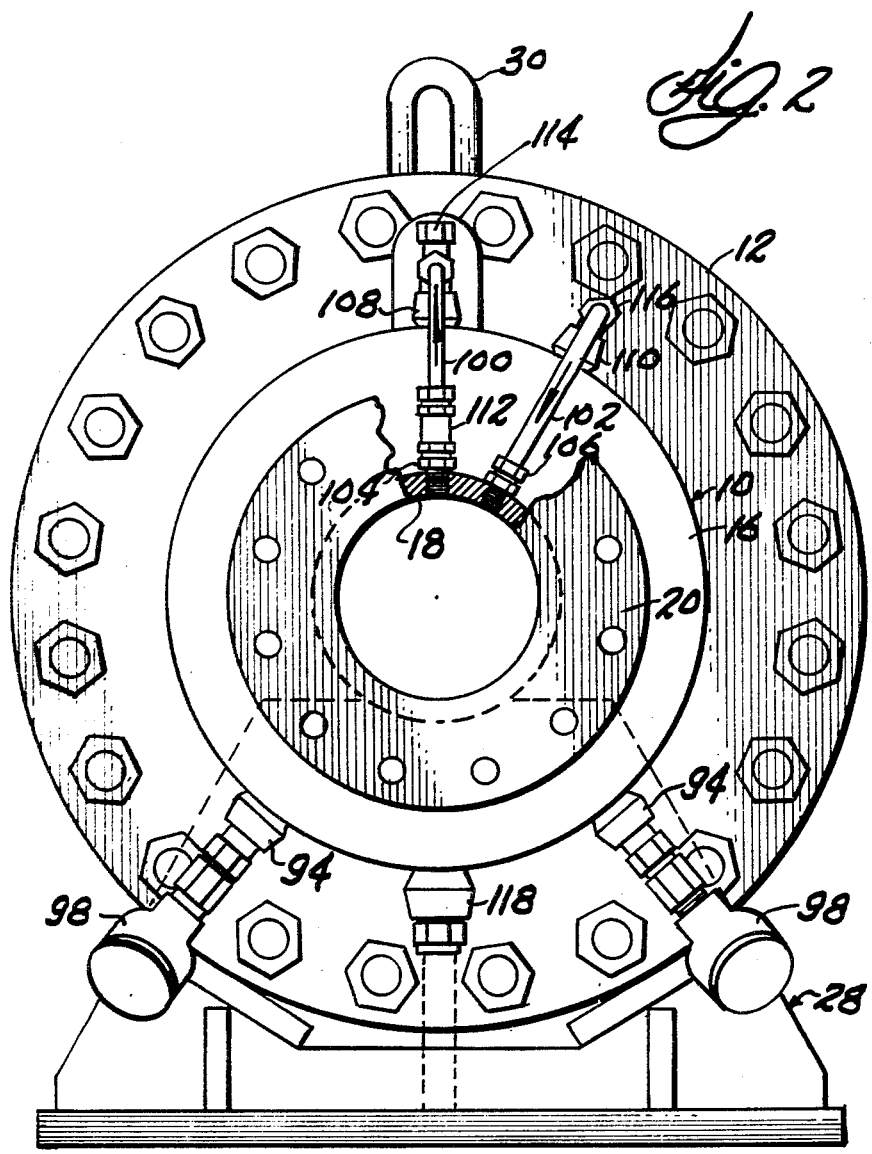

3,471,774
NUCLEAR MAGNETIC RESONANCE FLOW
METER HOUSING ASSEMBLY
Richard J. Muschinske and Bernard M. Silverberg,
Milwaukee, Wis., assignors to Badger Meter Mfg.
Company, Milwaukee, Wis., a corporation of
Wisconsin
Filed Aug. 3, 1966, Ser. No. 570,065
Int. Cl. G01r 33/08
U.S. Cl. 324—.5                              15 Claims

ABSTRACT OF THE DISCLOSURE

The embodiment disclosed is a NMR flowmeter including a thin-walled, electrically nonconductive, nonferromagnetic flow tube with magnetic tagging and detection components telescopically positioned over the flow tube, and a pressure casing encompassing the flow tube and the tagging and detection components. The pressure casing delimits a cavity around the flow tube, and small conduits connect this cavity with the flow passage through the assembly to avoid large pressure differentials across the flow tube. The pressure casing is divided into two end sections which telescopically engage over the respective ends of the flow tube and the related components and support the tagging and detection components. An internal support for the tagging and detection components fits over the flow tube and extends transversely of the pressure casing at the joint between the two sections of the casing.

This invention relates to flow meter assemblies and particularly to housing and mounting assemblies for components of fluid flow measuring apparatus which require magnetic coupling with the flowing fluid.

Systems have been developed which utilize the phenomena of nuclear magnetic resonance (hereinafter referred to as NMR) to measure fluid flow, for instance as disclosed in the copending applications Ser. Nos. 445,117, filed Apr. 2, 1965, now Patent No. 3,419,793, 485,842, filed Sept. 8, 1965, now abandoned, and 570,066 (continuation-in-part of Ser. No. 485,842), filed Aug. 3, 1966, now Patent No. 3,419,795, by William K. Genthe, William H. Vander Heyden and Donald H. Strobel. In such systems it is important that the magnetic field generating and sensing components, and particularly the detecting components, be in efficient magnetic coupling relation with the flowing fluid. Accordingly, these magnetic means should be as close to the flowing fluid as possible and there should be no extraneous magnetic fields and no intervening materials which will significantly reduce, disrupt or distort the magnetic coupling between the magnetic means and the fluid. It also is desirable to avoid the deleterious effects of elements projecting into the flow stream and of irregularities in the walls of the conduit confining the flow stream. That is, it is desirable that in the area of flow measurement the flow stream be confined in a conduit having a smooth uniform continuous inner flow-conducting bore and that the metering elements be isolated from the flowing fluid being metered. A further requirement for meter assemblies of the type to which this invention pertains is that they must be designed to contain fluids flowing under high pressure, as, for example, in petroleum product pipelines, confined liquid hydrogen systems, hydraulic lines and water systems.

It is an object of this invention to provide an assembly of metering components meeting the requirements outlined above. It is another object of this invention to provide an improved mounting assembly for components of a flow measuring apparatus providing efficient magnetic field coupling or magnetic energy transfer between the flow measuring apparatus and the flow stream. It is another object of this invention to provide an improved assembly of components of an NMR flow measuring system and particularly such an assembly adapted to be used in measuring fluid flow under high pressures. It is another object of this invention to provide such an improved housing assembly which may be used to measure the flow of combustible materials without supporting a fire started externally of the assembly. Further objects of this invention are to provide an improved meter housing assembly as above which is compact, which readily meets the applicable American Petroleum Institute standards and the National Electrical Code, and which may be economically produced.

In carrying out this invention in one illustrative form, a meter assembly is provided comprising a thin-walled non-ferro-magnetic and non-electrically-conductive conduit section, magnetic means including a magnetic field generating element and magnetic state detecting elements positioned circumjacent the conduit section, a pressure vessel encompassing said conduit section and said elements, with appropriate means for extending electrical leads from the magnetic field generating and detecting elements through the pressure vessel, and means for maintaining the pressure within the pressure vessel, externally of the conduit, substantially equal to the instantaneous pressure generated in the flow conducting bore of said conduit section.

For a more complete understanding of the invention reference should be had to the embodiment illustrated in greater detail in the accompanying drawings and described below by way of an example of the invention.

In the drawings, FIG. 1 is a vertical cross-sectional view of a meter housing assembly employing teachings of this invention, and FIG. 2 is an end elevation view of the assembly of FIG. 1.

Referring particularly to FIG. 1, the illustrated meter assembly includes a generally cylindrical, hollow, outer pressure casing 10 divided transversely of its longitudinal axis into two end portions detachably joined to one another by annular flanges 12 and 14. One end portion includes the flange 12, a hollow cylindrical section 15, an end section 16 and a tubular section 18 which extends internally and externally of the casing as illustrated. The other end portion of casing 10 includes the flange 14, an end section 22 and a tubular section 24 corresponding generally to section 18. A mounting flange 26 is provided on the outer end of section 24 for convenient installation, and a similar flange 20 may also be provided on the outer end of section 18 (see FIG. 2). The various sections of each end portion are suitably joined together, as by welding. A support frame or cradle may be provided for the casing as indicated generally at 28, and lifting lugs or handles are provided at 30 and 32.

A thin-walled tubular conduit 34 extends through casing 10, generally coaxial therewith, and is in telescopic engagement with each of the end tubular sections 18 and 24. O-ring seals 36 and 38 are provided between the respective ends of conduit 34 and tubular end sections 18 and 24. The conduit 34 thus defines a smooth bore flow tube for conducting fluid through the meter housing assembly between the end sections 18 and 24.

Conduit 34 is formed of material which will facilitate passage through its wall of magnetic fields for coupling various magnetic field generating and/or receiving components located externally of the conduit with fluid flowing in the conduit, without significantly reducing or distorting these magnetic fields. The most stringent application of these requirements is in the area of the detecting mechanism where, as indicated further below, both constant or unidirectional, and RF magnetic fields must be transmitted through the conduit wall, with the requirements that one or both types of such fields must be homogeneous and closely controllable within the conduit, and where the RF field or fields to be transmitted may be of very low magnitude. To these ends conduit 34 is formed of material of low magnetic permeability, which may be paramagnetic though non-ferro-magnetic, for passage of the magnetic fields and which is electrically non-conductive to facilitate passage of the RF magnetic fields, without significant reduction or distortion of such fields. The conduit also is of uniform construction, and hence of uniform magnetic properties, to facilitate generating uniform fields in fluid flowing in the conduit. Further, the conduit should be nondeformable to avoid changes in its cross section under contemplated pressure differentials. As one example of conduit meeting the aforementioned requirements, a conduit 34 having an inside diameter of 6.24" and a wall thickness of 0.087" was formed of epoxy resin and woven glass cloth.

As illustrated, the internal diameter of casing 10 is substantially larger than the outside diameter of the flow tube 34. Magnetic field means are mounted in the annular space provided between the tube 34 and casing 10 for generating magnetic fields within the fluid flowing through tube 34 at one station, and sensing the magnetic state of the flowing fluid at a second station, to measure the fluid flow in the flow tube. In the illustrated meter assembly, these magnetic field means include a coil 40 circumscribing the tube 34 within end section 22 and flange 14. The coil 40 is potted in a magnetic shield 41 comprising a circumferential section 42 and end flange sections 44 and 46. These sections are of suitable material having a high magnetic permeability, such as low carbon steel, to control the external magnetic flux from coil 40 and to shield the area of conduit 34 circumscribed by coil 40 from extraneous magnetic fields. Flange section 46 has a sliding fit on a reduced portion 24a of the inner end of section 24, and flange 44 has a sliding fit on a reduced portion 48a of the adjacent end of a center support tube 48. Tube 48 is slidably mounted in a center support ring 50. The ring 50 is received and supported in a suitable annular recess defined by annular groove in the mating faces of the flange 12 and 14 as illustrated. The coil 40 and coil shield 41 are supported on section 24 and tube 48 and thus are supported directly upon the external casing 10, with the coil closely adjacent the flow tube 34 and without imposing any load on the flow tube.

In the operation of the illustrated meter unit, coil 40 is periodically energized by a suitable power source (not shown) through electrical leads 51 to provide intermittent pulses of a high intensity, unidirectional magnetic field in the circumscribed volume of tube 34 for magnetically "tagging" successive boluses of fluid flowing through tube 34, from left to right as viewed in FIG. 1. Within the right hand portion of the casing 10, as seen in FIG. 1, and surrounding the tube 34, there is illustrated one combination of components for sensing the passage of tagged boluses of fluid. The illustrated sensing components include a solenoid-type field coil 52 circumscribing tube 34, with end compensation coils 54 and 56, and two pairs of yoke coils 58 and 60 circumjacent tube 34, all connected to suitable external system components (not shown) by electrical leads 61. In outline, coils 52, 54 and 56 provide a relatively homogeneous unidirectional magnetic field in the encompassed volume of flow tube 34, parallel to the magnetic field generated by coil 40, while an RF signal is applied to one pair of the yoke coils to generate an RF magnetic field in the fluid, with an axis transverse to the field of coil 52, and the other pair of yoke coils (in orthogonal relation with the first pair) serves as the pick-up of a receiver system (not shown) for sensing variations in resonance conditions between the RF signal and the flowing fluid to detect the passage of boluses tagged by coil 40. The illustrated tagging and sensing system is more fully described and claimed in the aforementioned applications Ser. Nos. 485,482 and 570,066.

Coil 52 is mounted on a hollow cylindrical form 62 having support flange 64 at one end and supported on an annular shoulder 66 of an annular flange 68 at the opposite end. Flange 64 is formed with a counterbore 64a which fits over the inner end of tubular section 18, while flange 68 is formed with a counterbore 68a which fits over the adjacent end of center support tube 48. Annular channel elements 70 and 72 are mounted on the flanges 64 and 68 and support the end compensation coils 54 and 56. Support elements 62, 64, 68, 70 and 72 are formed of suitable non-ferro-magnetic materials and, in one instance, were formed of paper impregnated with a phenolic resin.

An annular yoke coil support element 74 having a shallow H-shaped cross section fits within and is supported by the cylindrical member 62. The yoke coils 58 and 60 are supported on the element 74, receiver coils 58 being on the inner surface of the cylindrical body of the support 74 and RF transmitter coils 60 being on the outer surface thereof. The coils are disposed in orthogonal relation, as aforenoted, and each coil extends over an angle of about 120°, whereby coils 60 overlap coils 58 for about 30° at each end of each coil 60. The support 74 conveniently permits this overlapping arrangement. As will be observed, the detection coils 58 and 60 are thus disposed immediately circumjacent the thin-walled tube 34. Support 74 is formed of a material having low magnetic permeability, which may be paramagnetic though non-ferro-magntic, and which is non-electrically-conductive, one example being paper impregnated with a phenolic resin.

A magnetic shield 76 encompasses the coils 52–60. This shield comprises a cylindrical element 78 and two end rings 80 and 82 formed of suitable material having a high magnetic permeability, such as low carbon steel, to shield the detection station area of the meter from extraneous magnetic fields and to control the external magnetic flux of coils 52, 54 and 56. The end ring 80 is supported on tubular section 18, and end ring 82 is supported on the center support tube 48. Thus the detection coils 52–60 and the coil shield are also supported directly upon the external casing 10, without imposing any load on the flow tube 34.

Flange 80 has a sliding fit on a reduced portion 18a of section 18 and abuts shoulder 18b. Flange 82 has a sliding fit on support tube 48, between an annular protruding flange 84 on the support tube and an annular resilient spacer 86 which abuts support ring 50.

The annular flange 46 of the shield 41 abuts a resilient spacer element 88 disposed between this flange and an abutment ring 90 which fits over a reduced portion 24b of the tube section 24 and seats against a shoulder 24c as illustrated.

The telescopic mounting arrangement thus provided for the various internal components of the illustrated meter housing assembly permits simple and expedient assembling and disassembling of these components with the respective end portions of the casing 10. The resilient spacers 86 and 88 provide for the necessary tolerances in the various components while insuring that when the meter is assembled, and the end portions of the casing are brought together and bolted through flanges 12 and 14, the internal components will be held in fixed relation with respect to one another to provide a fixed distance between the center of the coil 40 and the center of the detection coils. This fixed distance, together with the fixed cross-sectional area of the flow tube between these coils insures consistent accuracy of the meter during use. It will be appreciated that the sensing and recording equipment of a metering system utilizing the illustrated housing assembly may be calibrated in accordance with the volume of the conduit bore between the centers of the noted coils, but this volume must remain fixed to avoid variations and attendant inaccuracies during operation of the system.

An appropriate seal such as a gasket 92 is provided between the flanges 12 and 14.

The electrical leads 51 and 61 from the various components extend through suitable pressure connections in casing 10, as at 94 and 96. Suitable connections are known in the art, one type comprising elastic insulating material compressed within a metal housing and thereby preserving a pressure sealing engagement with the wires and with the confining housing. The leads from the various components may be isolated from one another by appropriate shielding or by physical separation and passage through separate pressure connections. Explosion proof connection boxes 98 are provided for connecting the coils with appropriate external components.

Referring now also to FIG. 2, two pressure compensating lines are provided, comprising tubes 100 and 102 attached to suitable fittings 104 and 106 in communication with the interior of section 18 and to suitable fittings 108 and 110 in communication with the annular space between casing 10 and the flow tube 34. A check valve 112 permits flow through tube 100 only into the casing 10. This line is also provided with a filling connection at 114 for charging a fluid to the casing 10. A check valve 116 permits flow through tube 102 only from the space within casing 10 to the tubular section 18. Check valve 116 is prebiased to a minimum threshold pressure to retain fluid in the annular space between casing 10 and flow tube 34 during handling of the housing assembly, thereby permitting filling of the assembly prior to shipment and permitting installation and removal of the unit without draining the fluid therefrom. The seals 36 and 38 prevent leakage of such fluid from the space around tube 34.

In use, the space between casing 10 and tube 34 may be filled with the fluid which is to be metered. The two flow lines 100 and 102 insure the maintenance of the pressure within the casing 10, externally of tube 34, substantially equal to the pressure within the flow tube 34, i.e., within the pressure differential determined by the bias on the check valves 112 and 116. Thus, regardless of the pressure of the fluid within tube 34, this tube is not subjected to a pressure differential greater than that minimum pressure determined by the biasing of the check valves. For instance, these valves may be set at 20 p.s.i., or less, in an assembly to be used in metering fluids at much higher pressures, such as 300 p.s.i. This permits the use of a thin-walled flow tube 34, such as the abovementioned example of conduit 34, to permit positioning of the magnetic field means very close to the fluid flowing through the tube 34 while providing an external casing of suitable materials, e.g., steel, of suitable thickness to contain fluids at high operating pressures such as are encountered in many metering installations, for instance in petroleum products pipelines, liquid hydrogen systems and many other installations. The casing 10 also protects the tube 34 from externally applied forces, thereby permitting the use of relatively fragile electrical insulating materials for the flow tube.

The outer casing is of a sealed construction and may utilize standard pipeline flanges for flanges 12 and 14 to conveniently and economically meet the various code standards. For instance in one assembly for use in a 6" pipeline, standard 16" API flanges were used for flanges 12 and 14, and standard 6" API flanges were provided at 20 and 26 for joining the meter unit to adjacent sections of the pipeline. This disclosed construction readily conforms to standards such as those prescribed by the American Petroleum Institute (API) and the National Electrical Code.

A drain plug 118 is provided at the lower side of the casing 10, and an air escape valve is provided at 120 to facilitate filling and draining of the casing 10 with liquid. Passages are provided through the various internal components, as at 122–130, to insure free communication of the fluid therethrough in filling and draining the casing 10 and to avoid build-up of pressure differentials across any of these internal components.

In the illustrated embodiment the coil 40, support tube 48, support 74 and coil pair 58, are of slightly greater inside diameter than the outside diameter of tube 34, e.g., on the order of 0.125", to facilitate the telescopic assembly of the internal components and to avoid imposing any structural load on tube 34, while retaining the coils as close as possible to the fluid flow stream within tube 34.

The coil pair 58 may, if desired, be placed in a notch or recess (not shown) in the exterior surface of the tube 34, to permit the coil pair to be placed as close as possible to the fluid within the tube. The recess may be filled in over the coil pair with epoxy or the like.

It will be seen that an improved meter housing assembly has been provided which meets the above-stated objects and which provides additional advantages.

It will be obvious that other modifications of the specific embodiment shown may be made without departing from the spirit and scope of this invention. For example, and not by way of limitation, other arrangements may be provided for tagging the flowing fluid, other detection apparatus may be utilized, and detection coils may be mounted and shielded by other means. Accordingly, while a particular embodiment of this invention is shown and described above, it will be understood that the invention is not to be limited thereto since many modifications may be made by those skilled in the art, particularly in light of the foregoing disclosure.

We claim:

1. A fluid meter housing assembly comprising a pressure casing, means including a non-ferromagnetic, electrically non-conductive conduit section disposed within said pressure casing defining a flow path through said casing, said pressure casing being in encompassing spaced relation to said conduit section whereby said conduit section and said pressure casing define a cavity therebetween isolated from said flow path, magnetic field means disposed within said pressure casing for magnetic coupling with fluid in said flow path for deriving flow rate information using a nuclear resonance effect in such fluid, and conduit means communicating with said cavity and with said flow path for passage of fluid between said flow path and said cavity for maintaining fluid in said cavity at a pressure substantially equal to the pressure of fluid within said flow path.

2. A fluid meter housing assembly as in claim 1 including means at each end of said casing adapted for connection to adjacent conduits, and conduit portions extending internally of said pressure casing from said connection means and communicating with said conduit section therein.

3. A fluid meter housing assembly as in claim 1 wherein said conduit means comprises two conduits each communicating with said cavity and with said flow path, and a check valve in each of said conduits, one of said check valves permitting flow from said flow path to said cavity and precluding flow in the opposite direction through the respective conduit, the other of said check valves biased and permitting flow from said cavity to said flow path when subjected to a predetermined pressure differential and precluding flow in the opposite direction through the respective conduit.

4. A fluid meter housing assembly as in claim 1 wherein said conduit section comprises a continuous, thin-walled, tubular element of non-ferro-magnetic and non-electrically-conductive material.

5. A fluid meter housing assembly as in claim 1 wherein said magnetic field means is supported on said pressure casing.

6. A fluid meter housing assembly as in claim 1 wherein said magnetic field means includes a magnetic field generating element for tagging successive spaced boluses of fluid flowing through said conduit means, and detection means responsive to the paramagnetic state of fluids flowing in said conduit and spaced from said magnetic field generating element axially of said conduit section.

7. A fluid meter housing assembly as in claim 6 wherein said magnetic field generating element comprises an electromagnet circumjacent said conduit means, and said detection means includes yoke coils circumjacent said conduit section, and electrical leads connected to said coils and extending outwardly of said casing through pressure seals.

8. A fluid meter housing assembly as in claim 1 wherein said pressure casing comprises two sections detachably joined along a plane generally normal to the axis of said conduit means.

9. A fluid meter housing assembly as in claim 1 wherein said magnetic field means includes a magnetic field generating element and detection means spaced from one another axially of said conduit section, and a support element extending transversely of said pressure casing between said magnetic field generating element and said detection means and supported on said pressure casing, said magnetic field generating element and said detection means being supported on said transverse support element.

10. A fluid meter housing assembly comprising an elongated, thin-walled non-ferro-magnetic and electrically non-conductive conduit section, magnetic field generating and sensing components adjacent said conduit section for magnetic coupling with fluid flowing through said conduit section for deriving flow rate informatiton using a nuclear resonance effect in such fluid, and complementary pressure casing sections telescopically engaging over the ends of said conduit section and encompassing said conduit section and said magnetic field generating and sensing components, said pressure casing sections being detachably joined to one another along a plane transverse to the longitudinal axis of said conduit section and forming a pressure casing encompassing said conduit section and said components.

11. A fluid meter housing assembly as in claim 10 wherein said magnetic field generating and sensing components telescopically engage over said conduit section and are supported by said pressure casing.

12. A fluid meter housing assembly as in claim 10 including a support element supported on said pressure casing at the joint between said casing sections, said magnetic field generating and sensing components being supported on said support element.

13. A fluid meter housing assembly as in claim 12 wherein said generating and sensing components include components disposed within each of said casing sections.

14. A fluid meter housing assembly as in claim 12 wherein said generating and sensing components include a magnetic field generating means in one of said casing sections for tagging successive spaced boluses of fluid flowing through said conduit section, and detection means in the other of said casing sections for detecting the passage of such tagged boluses.

15. A fluid meter housing assembly as in claim 10 including a center support element supported on said pressure casing at the joint between said casing sections, wherein said magnetic field generating and sensing components telescopically engage said support element and telescopically engage said casing adjacent each end of said casing.

References Cited
UNITED STATES PATENTS

| | | | |
|---|---|---|---|
| 3,094,000 | 6/1963 | Kass | 324—34 |
| 3,191,119 | 6/1965 | Singer | 324—0.5 |
| 3,355,944 | 12/1967 | Sipin | 73—194 |

RUDOLPH V. ROLINEC, Primary Examiner

MICHAEL J. LYNCH, Assistant Examiner

U.S. Cl. X.R.

73—194

FO-1050
(5/69)

UNITED STATES PATENT OFFICE
CERTIFICATE OF CORRECTION

Patent No. 3,471,774      Dated October 7, 1969

Inventor(s) Richard J. Muschinske & Bernard M. Silverberg

It is certified that error appears in the above-identified patent and that said Letters Patent are hereby corrected as shown below:

Column 3, line 43, "groove" should read -- grooves -- line 43, "flange" should read -- flanges -- . Column 5, line 67, "This" should read -- The -- . Column 6, line 13, "extreior" should read -- exterior --; line 17, insert "thus" after -- will --; line 61 (Claim 3), insert "being" before -- biased -- . Column 7, line 31 (Claim 10), "informatiton" should read -- information -- .

Signed and sealed this 9th day of May 1970.

(SEAL)
Attest:

EDWARD M. FLETCHER, JR.
Attesting Officer

WILLIAM E. SCHUYLER, JR.
Commissioner of Patents

UNITED STATES PATENT OFFICE
CERTIFICATE OF CORRECTION

Patent No. 3,471,774  Dated  October 7, 1969

Inventor(s)  Richard J. Muschinske & Bernard M. Silverberg

It is certified that error appears in the above-identified patent and that said Letters Patent are hereby corrected as shown below:

Column 3, line 43, "groove" should read -- grooves --; line 43, "flange" should read -- flanges --. Column 5, line 67, "this" should read -- the --. Column 6, line 13, "extreior" should read -- exterior --; line 17, insert "thus" after -- will --; line 61 (Claim 3), insert "being" before -- biased --. Column 7, line 31 (Claim 10), "informatiton" should read -- information --.

This certificate supersedes Certificate of Correction issued May 9, 1970.

Signed and sealed this 14th day of July 1970.

(SEAL)
Attest:

EDWARD M. FLETCHER, JR.
Attesting Officer

WILLIAM E. SCHUYLER, JR.
Commissioner of Patents